(12) United States Patent
Benko et al.

(10) Patent No.: US 10,769,683 B1
(45) Date of Patent: Sep. 8, 2020

(54) METHODS AND SYSTEMS FOR IDENTIFYING A USER DEVICE FOR AFFILIATE MARKETING

(71) Applicant: Capital One Services, LLC, McLean, VA (US)

(72) Inventors: David Benko, Washington, DC (US); Matthew Hogan, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/684,136

(22) Filed: Nov. 14, 2019

(51) Int. Cl.
*G06Q 30/02* (2012.01)
*G06F 16/955* (2019.01)

(52) U.S. Cl.
CPC ..... *G06Q 30/0277* (2013.01); *G06F 16/9566* (2019.01)

(58) Field of Classification Search
CPC .................. G06Q 30/0277; G06F 16/9566
See application file for complete search history.

(56) References Cited

U.S. PATENT DOCUMENTS

| 7,925,973 | B2 | 4/2011 | Allaire et al. | |
|---|---|---|---|---|
| 10,127,564 | B2 | 11/2018 | Heath | |
| 2007/0294750 | A1* | 12/2007 | Burch | G06Q 40/04 726/5 |
| 2008/0289049 | A1* | 11/2008 | Morris | G06F 21/6218 726/28 |
| 2009/0276305 | A1* | 11/2009 | Clopp | G06Q 30/00 705/14.16 |
| 2015/0200962 | A1* | 7/2015 | Xu | G06F 21/562 726/23 |
| 2016/0055252 | A1* | 2/2016 | Makeev | G06F 16/24578 707/733 |
| 2016/0142443 | A1* | 5/2016 | Ting | H04W 4/02 726/1 |

* cited by examiner

*Primary Examiner* — Matthew J Ellis
(74) *Attorney, Agent, or Firm* — Bookoff McAndrews, PLLC (57) ABSTRACT

A computer-implemented method may be provided for identifying a user device. An identification server in communication with the user device may receive a request from a browser of the user device to access, from a destination uniform resource locator (URL), an asset from the identification server. The request from the browser may be received from a website server. The asset is configured to be presented on a webpage hosted by the website server. The request from the browser may be modified to associate a new identity attribute of the user device with the request.

19 Claims, 7 Drawing Sheets

METHODS AND SYSTEMS FOR IDENTIFYING A USER DEVICE FOR AFFILIATE MARKETING

TECHNICAL FIELD

Various embodiments of the present disclosure relate generally to correlating end user request activities across affiliate websites, including identifying user devices.

BACKGROUND

Often, in affiliate-based marketing, acquiring user impression data and trend analytics data is important to effectively target end user needs. Obtaining such data typically requires owners of affiliate websites to add code (such as a JavaScript tag) to the website or to otherwise agree to share user data with third parties. In some circumstances, affiliate websites may be unable or unwilling to provide such information. Thus, in these situations, user impression data may be unavailable outside of the affiliate website, which may result in mismatched or sub-optimal product targeting and product offerings.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for identifying a user device and a browser operating on the user device by a user. In one aspect, a method is provided that may comprise, at an identification server in communication with the user device over a network, receiving a request from a browser of the user device to access, from a destination uniform resource locator (URL), an asset from the identification server, wherein the request from the browser is received from a website server and wherein the asset is configured to be presented on a webpage hosted by the website server; and modifying the request from the browser to associate a new identity attribute of the user device with the request.

In another aspect, a method is provided that may comprise, at an identification server in communication with the user device over a network, receiving a request from a browser of the user device to access, from a destination uniform resource locator (URL), an asset from the identification server, wherein the request from the browser is received from a website server, and wherein the asset is configured to be presented on a webpage hosted by the website server; determining whether an identity attribute of the user device is present in the request; when the identity attribute is not present in the request, modifying the request from the browser to associate a new identity attribute of the user device with the request; and when the identity attribute is present in the request, updating a database with data associating the webpage and the website server with the user device.

In yet another aspect, a method is provided that may comprise, at an identification server in communication with the user device over a network, receiving a request from a browser of the user device to access, from a destination uniform resource locator (URL), a card art asset from the identification server, wherein the request from the browser is received from a website server, and wherein the card art asset is configured to be presented on a webpage hosted by the website server; and predicting information about the user device based on data stored in a database of other user devices that have made previous requests for the card art asset.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, identification techniques, such as identification via web browsers on a user device, may be used to identify user devices.

Figure 1:
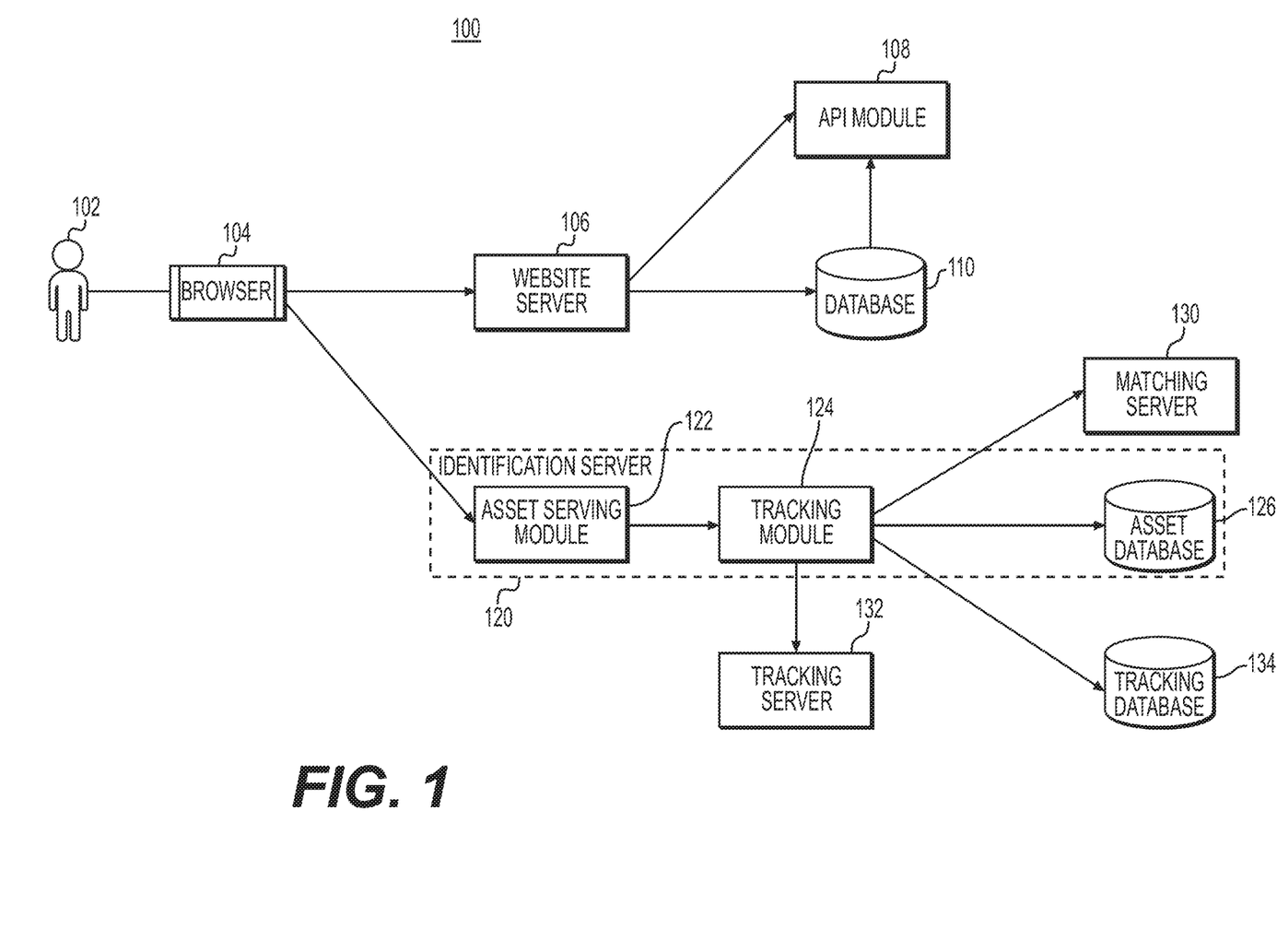
FIG. 1 depicts an example system infrastructure, according to one or more embodiments.

FIG. 1 is a diagram depicting an example of a system environment 100. The system environment ("system") 100 may include a user 102, a browser 104, a website server 106, an application program interface (API) module 108, a database 110, an identification server 120, a matching server 130, a tracking server 132, and a tracking database 134. The identification server 120 may include an asset serving module 122, a tracking module 124, and an asset database 126. The entities in FIG. 1 may communicate with one another over a network (not shown in FIG. 1). For example, the entities may communicate with one another over a wide area network (WAN) such as the Internet.

The user 102 may be a computing device or a human user operating a computing device (e.g., a computer, laptop, desktop, tablet, mobile device, etc.) to operate the browser 104 to connect with the website server 106, e.g., over the Internet. For example, the user 102 may enter a web address into the browser 104 or otherwise initiate the browser 104 to connect with the website server 106 to obtain content (e.g., a webpage) hosted by the website server 106. The website server 106 may communicate over the network to the API module 108 and the database 110 to obtain content to deliver to the browser 104.

In one example, the website server 106 may be an affiliate website server that is configured to host content and display images about content and products from multiple sources. For example, the affiliate website server may be a website server that compares credit card, banking, or other financial products and/or product information from multiple sources. However, it is noted that this is merely an example, and it should be appreciated that the affiliate website server may be a website server for other product, services, or industries. The affiliate website server may render an asset (e.g., images associated with each of the product offerings/information) and may deliver the asset to the browser 104 for viewing and interaction by the user 102. In one example, the affiliate website server may render card art images for viewing and interaction by the user 102 by instructing the browser 104 to interact with the identification server 120 to obtain the card art images. These techniques are described in more detail herein.

As stated above, the identification server 120 comprises the asset serving module 122. The asset serving module 122 may be configured to interact with the tracking module 124 to render the asset along with identity information of a user device operated by the user 102 (e.g., an identity attribute), as described by the techniques herein. The identification server 120 may also be configured to communicate with the matching server 130, for example, to verify and match the identity attribute of the user device, as described herein. Furthermore, the identification server 120 may be configured to communicate with the tracking server 132 to track the identity attribute information and to save the tracking information to the tracking database 134.

In some examples, it may be desirable for the identification server 120 to generate and provide identity attribute information for the user device when the browser 104 requests an asset from the asset serving module 122. The identity attribute information may be used to gather and leverage user data including, for example, impression data, browser data, language information, geographic information, and trend information about products being marketed. In some examples, the identity attribute information enables such user data to be collected and monitored without requiring an affiliate website hosted by the website server 106 to install or add code (e.g., such as a Hypertext Markup Language (HTML) tag or a javascript tag) or to explicitly agree to share data. This may be especially useful in situations where the entity owning or hosting the affiliate website may compete directly or indirectly with products being marketed, or are affiliates for other competing products. Analytics data can be gathered by utilizing the identity attribute information and can be used to directly market to the user 102 outside of the affiliate network or to gather valuable information around product positioning (e.g., asset/ image positioning) on the affiliate website or other website. The techniques for generating, tracking, and monitoring the identity attribute information are provided herein.

For example, in FIG. 1, the user 102 may utilize the browser 104 on a user device to connect to an affiliate website hosted by the website server 106. The website server 106 may initiate an application program interface (API) call to the API module 108 to request website content information. The website server 106 may also initiate a data cache request to the database 110. The data cache request, for example, may be a request from the website server 106 for content stored in the database 110 to be displayed on the website hosted by the website server 106. The database 110 may be configured to send data to the API module 108 periodically. For example, the website server 106 may request cached data stored in the database 110 from a previous data request of the website server 106 (e.g., a previous request for data from the website server 106 to either the API module 108 or the database 110). In general, the website server 106 communicates with both the API module 108 and the database 110 to obtain information and data to be displayed on the website hosted by the website server 106. For example, the website server 106 may receive a portion of information displayed on the website from the API module 108 (for example, stock quotes or banking information from a corresponding banking API module 108) and general text or graphical information from the database 110. The database 110 and the API module 108 are configured to communicate with each other, e.g., to forward data requests made by the website server 106 and to store data requested by the website server 106.

In some instances, the website server 106 may need to render certain assets (e.g., images such as card art images) for display on the website requested by the browser 104. The website may need to render these assets, for example, to comply with financial regulations (e.g., for displaying a credit card image) or to comply with company requirements (e.g., company approval to display a product such as a credit card image). The card art images, for example, may be images of credit card(s), debit card(s), or other financial products being displayed on the website. The website server 106 may not have direct access to the asset. For example, the asset may be generated and stored at a server remote from the website server 106 and inaccessible by the website server 106 (e.g., the asset may be owned and hosted by a server remote from the website server 106). As a result, the website server 106 may instruct the browser 104 to obtain the asset from the identification server 120 such that the asset can be displayed appropriately on the website. In this example, the website server 106 may send an instruction to the browser 104 to communicate with the identification server 120 to obtain the asset (e.g., by instructing the browser 104 to access a uniform resource locator (URL) associated with the asset).

Upon this instruction, the browser 104 may request access for the asset from the asset serving module 122 of the identification server 120. The asset serving module 122 may then communicate the request to the tracking module 124. The tracking module 124 may communicate with the matching server 130 to determine whether the request from the browser 104 (e.g., the URL associated with the asset) contains an identity attribute. If so, the tracking module 124 may store information about the asset request in the tracking database 134 and associate the asset request with the identity attribute. If the request does not contain an identity attribute, the tracking module 124 may generate a new identity attribute to uniquely identify the user device on which the browser 104 is accessed, and store the new identity attribute in the tracking database 134. The tracking module 124 may retrieve the requested asset from the asset database 126 (e.g., a card art image stored in the asset database 126), and return the asset to the browser 104 such that the asset is displayed on the website hosted by the website server 106.

Figure 2A:
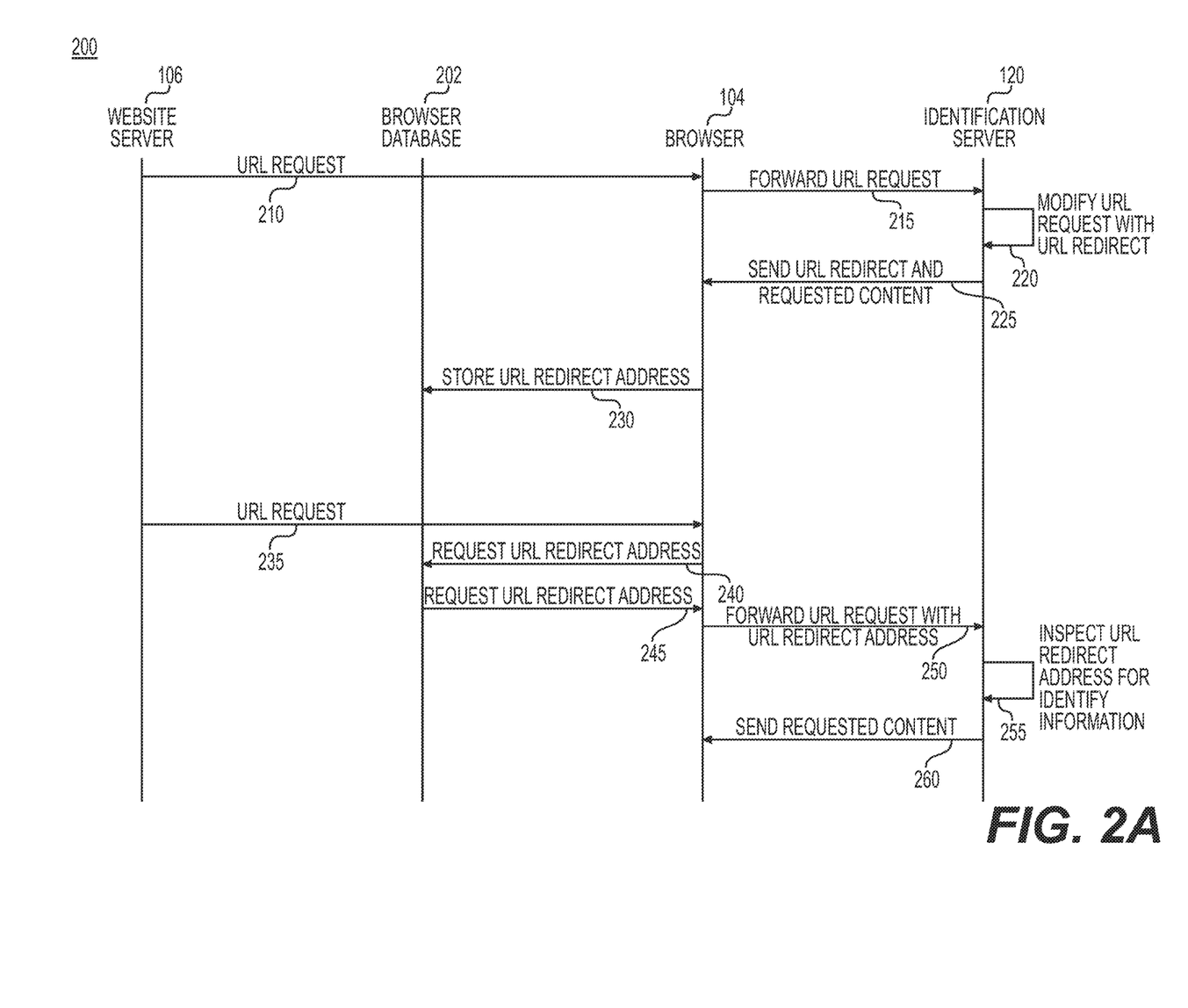
FIGS. 2A and 2B depict data flow diagrams showing communications between a website server, browser, and an identification server, according to one or more embodiments.

Reference is now made to FIG. 2A, which shows a first example data flow diagram 200. The data flow diagram 200 shows communications exchanged between the website server 106, a browser database 202, the browser 104, and the identification server 120. At 210, the website server 106 may forward a URL request to the browser 104. The URL request from the website server 106 to the browser 104 may represent an instruction from the website server 106 to the browser 104 for the browser 104 to access an asset (e.g., card art) provided by the identification server 120. Thus, the URL request from the website server 106 to the browser 104 may contain a URL request indicative or associated with access to the specific asset requested. At 215, the browser 104 may forward the URL request to the identification server 120. For example, the browser 104 may receive the URL request 210 from the website server 106, which may constitute instructions for the browser 104 to forward the URL request to a remote server (e.g., the identification server 120). At 220, the identification server 120 may modify the URL request and create or generate a new redirected URL address. For example, this modification of the URL request may be used to track the browser and user device on which the browser 104 operates. The redirected URL address may comprise identity attribute information (e.g., an "identifier") that, for example, serves as a unique identifier for the browser 104 and/or for the user device on which the browser 104 is installed. Thus, contained within the new URL address (e.g., the URL address redirected in 220) is an identifier which the identification server 120 has generated and which the identification server 120 can track as it receives subsequent URL requests that contain the identifier. In one example, the identifier may be an alphanumeric identifier embedded within the redirected URL address. Though not shown in FIG. 2A, the identification server 120 may store the newly generated identity attribute information in a database (e.g., tracking database 134). At 225, the identification server 120 may send the URL redirect (from 220) to the browser 104 along with the requested content (e.g., the asset requested by the browser 104 in the URL request 215). At 230, the browser 104 may store the new URL redirect address in a database maintained by, or otherwise accessible by, the browser 104 (e.g., the browser database 202).

At 235, the website server 106 may request the same asset it requested in the URL request 210 by sending the URL request to the browser 104. Upon receipt, the browser 104 may, at 240, access the browser database 202 to request the URL redirect address (e.g., the URL redirect address with the identity attribute information it received from the identification server 120 at 225). The browser 104, at 245, may receive the URL redirect address from the browser database 202, and at 250, the browser 104 may forward the URL request with the URL redirect address it obtained from the browser database 202 to the identification server 120. The identification server 120 may inspect the URL redirect address for the identity attribute information at 255, and update the tracking database 134 (not shown in FIG. 2A), accordingly. At 260, the identification server 120 may send the requested content 260 to the browser 104.

It should be appreciated that, in one example, though FIG. 2A shows the URL request 235 originating from the same website server (e.g., website server 106) as the URL request 210, the URL request 235 may originate from a different website server altogether or from a different website hosted by the website server 106. For example, the URL request 235 may be for a card art image hosted by a new website that is different than the website that made the initial URL request 210. Thus, in this example, the identification server 120 can inspect the URL redirect address upon receipt for the identity information of the browser 104 and the user device of the user 102 to track the browser's interaction with the new website. As a result, the identification server 120 can determine that the browser 104 visited both the new website and the website that made the original URL request in 210. In the example where the URL request 235 originates from the same website server 106 and/or from a same website hosted by the website server 106 as the original URL request 210, the identification server 120 can utilize the identity information in the redirected URL to track the browser's 104 interaction with the website.

It should be appreciated that the identification server 120 can modify the URL request in several ways at operation 220 to include the identifier information for the browser 104 and/or the user device on which the browser 104 is installed. In one example, the URL request may be modified to include an electronic tag ("Etag") that serves as a unique identifier for the browser 104. In this example, on every new request for the same URL (e.g., such as new URL request in 235), the browser 104 may provide, to the identification server 120, the Etag as it forwards the URL request with the URL redirected address (e.g., the operation at 250 of FIG. 2A). When the identification server 120 receives the Etag from the browser 104, the identification server 120 can correlate the new URL request with earlier requests that contain the same Etag. Thus, the identification server 120 can use the Etag to effectively track the browser history of the browser 104 (and as a result, the user 102 and a user device operated by the user 102).

In another example, the identification server 120 may modify the URL request (e.g., the operation at 220 of FIG. 2A) by inserting the identifier information in a hypertext transfer protocol (HTTP) 301 redirect for the URL request it receives from the browser 104 at 215. In this example, the identification server 120 may modify the URL request by indicating that the URL sent by the browser 104 at 215 has been "moved permanently" in accordance with the HTTP 301 protocol. As a result, when the browser 104 receives the HTTP 301 redirect (e.g., at step 225 in FIG. 2A), the browser 104 may store or cache in a table maintained in the browser database 202 the HTTP 301 redirect for the URL request it received at 210 from the website server 106 and requested in at 215. In the instance of a subsequent URL request (e.g., the subsequent URL request at 235), the browser 104 may access the HTTP 301 redirect stored in the browser database 202 and redirect to the HTTP 301 redirect URL address, which includes the identifier added by the identification server 120 at 220. Thus, by providing an HTTP 301 redirect when serving or retrieving an asset for the browser 104, the identification server 120 may include identity attribute information of the browser 104 and may force the browser 104 to subsequently connect to a URL containing the unique identifier via the HTTP 301 redirect. The identification server 120 can then correlate earlier URL requests with the same unique identifier and can effectively track the browser history of the browser 104 (and the user 102 and a user device operated by the user 102).

Figure 2B:
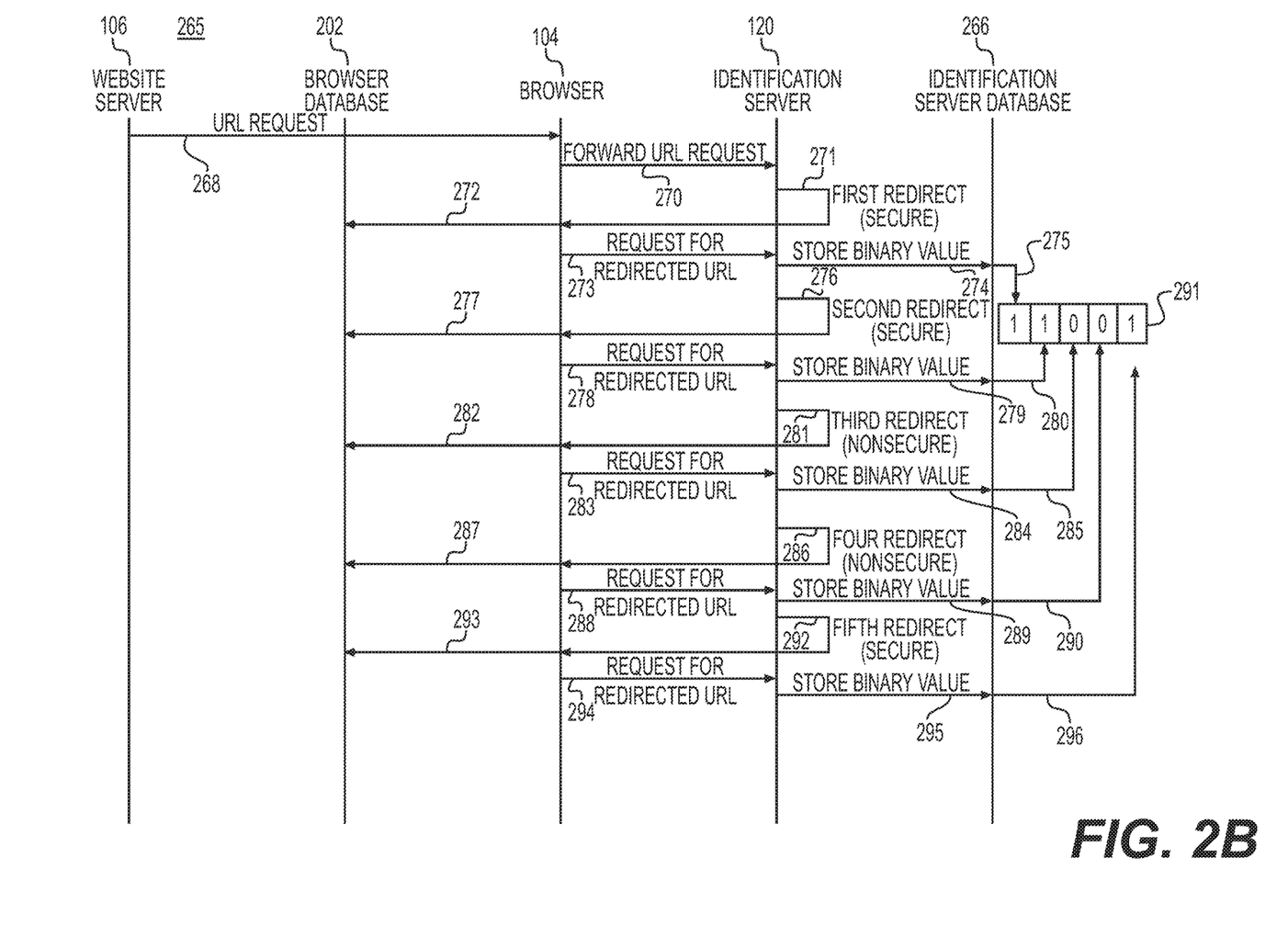

Reference is now made to FIG. 2B, which shows a second example data flow diagram 265. The data flow diagram 265 shows communications exchanged between the website server 106, the browser database 202, the browser 104, the identification server 120, and an identification server database 266 (e.g., which may be tracking database 134 in FIG. 1). At 268, the website server 106 may send a URL request to the browser 104. The URL request from the website server 106 to the browser 104 may represent an instruction from the website server 106 to the browser 104 for the browser 104 to access an asset (e.g., card art) provided by the identification server 120. At 270, the browser 104 may forward the URL request to the identification server 120. At 271, the identification server 120 may send a first URL redirect instruction to the browser 104. The redirect operation may be a secure redirect operation, for example, an HTTP Strict Transport Security (HSTS) to redirect the URL to a secure HTTP protocol (e.g., from an HTTP address to an HTTPS).

At 272, the browser 104 stores the redirected URL in the browser database 202, and at 273, the browser 104 sends a URL request for the redirected URL (e.g., the secure URL obtained from the identification server 120 at the first redirect in step 271) to the identification server 270. Upon receiving the URL request from the browser 104, the identification server 120, at 274, stores a first binary value in a binary string 291 stored in the identification server database 266. As will be described in detail here, the binary string 291 is a unique binary identifier for the browser 104, and the contents of binary string 291 are determined by the binary values stored by the identification server 120. As shown at 275, the identification server 120 stores a "1" binary value as the first element in the binary string. The "1" binary value is stored, for example, because the identification server 120 initiated a secure first redirect and received the secure first redirect from the browser 104. It should be appreciated that any binary value (e.g., a "1" or a "0") may be used to indicate the secure first redirect, and that the "1" binary value example described herein for a secure redirect and a "0" binary value example described herein for a nonsecure redirect are merely examples.

Upon storing the binary value, the identification server 120 may perform a second URL redirect at 276. The second URL redirect is a secure redirect. The browser 104 may receive the second URL redirect, and at 277, may store the second URL redirect in the browser database 202. At 278, the browser 104 may send a request to the identification server 120 for the second URL redirect, and upon receiving the request, the identification server 120, at 279, may store a second binary value in the binary string 291. Since the second redirect is a secure redirect, the identification server 120 may store, for example, a "1" value as the second binary value in the binary string 291, as shown at 280.

The identification server 120 may then perform a third URL redirect at step 281. The third URL redirect is a non-secure redirect (e.g., an HTTP redirect and not an HTTPS redirect). The browser 104 may receive the third URL redirect, and at 282, store the third URL redirect in the browser database 202. The browser 104 may then send a request, at 283, to the identification server 120 for the third URL. The identification server 120 may receive the request, and at 284, store a third binary value in the binary string 291. As shown at 285, the third binary value is stored as a "0" binary value since the third redirect is a non-secure redirect. The identification server 120 may then perform a fourth URL redirect at 286. The fourth URL redirect is a non-secure redirect, and the browser 104, at 287, may store the fourth URL redirect in the browser database 202. The browser 104 may then send a request, at 288, to the identification server 120 for the fourth URL. The identification server 120 may receive the request, and at 289, may store a fourth binary value in the binary string 291 as a "0" value, as shown in 290, since the fourth redirect is a non-secure redirect. Finally, the identification server 120 may perform a fifth URL redirect at 292. The fifth URL redirect is a secure redirect, and the browser 104, at 293, may store the fifth URL redirect in the browser database 202. The browser 104 may send a request, at 294, to the identification server 120 for the fifth URL. The identification server 120 may receive the request, and at 295, may store a fifth binary value in the binary string 291 as a "1" value, as shown in 296, since the fifth redirect is a secure redirect.

Thus, through the sequence of five intermediate redirects described in FIG. 2B, the identification server 120 is able to create a unique binary string 291 for the browser. It should be appreciated that any number of redirects may be performed by the identification server 120, and the five redirects shown in FIG. 2B is merely an example. The binary string 291 may serve as a unique identifier for the browser 104 (and/or the user 102 and a user device operated by the user 102). When the browser 104 receives a subsequent request for the URL that it received at 268 (e.g., a subsequent URL request for an asset provided by the identification server), the browser 104 may access the database 202 and undergo the series of secure/non-secure redirects previously set forth by the identification server 120 in FIG. 2B. As an example, when the browser 104 initially receives the URL request at 268, it undergoes the series of redirects described in FIG. 2B and illustrated in Table 1 below:

TABLE 1

| asset.example.com -> | HSTS response (secure redirect) -> | Redirect to a.example.com -> | Store binary value "1" |
|---|---|---|---|
| a.example.com -> | HSTS response (secure redirect) -> | Redirect to b.example.com -> | Store binary value "1" |
| b.example.com -> | No HSTS response (nonsecure redirect) -> | Redirect to c.example.com -> | Store binary value "0" |
| c. example. com -> | No HSTS response (nonsecure redirect) -> | Redirect to d.example.com -> | Store binary value "0" |
| d.example.com -> | HSTS response (secure redirect) -> | Redirect to e.example.com and provide asset -> | Store binary value "1" |

When the browser 104 next attempts to connect with the same URL requested by the website server 106 (e.g., the URL requested at 268 in FIG. 2B), the browser will access the browser database 202 for the series of redirects for that particular redirect and will automatically connect as shown in Table 2:

TABLE 2

| | | |
|---|---|---|
| http://asset.example.com -> | Redirect to https://a.example.com (secure redirect) | Binary value "1" |
| https://a.example.com -> | Redirect to https://b.example.com (secure redirect) | Binary value "1" |
| https://b.example.com -> | Redirect to http://c.example.com (non-secure redirect) | Binary value "0" |
| http://c.example.com -> | Redirect to http://d.example.com (non-secure redirect) | Binary value "0" |
| http://d.example.com -> | Redirect to https://e.example.com (non-secure redirect) and provide asset | Binary value "1" |

Thus, as the browser 104 attempts to subsequently connect to the URL, the identification server 120 can uniquely identify the browser 104 by associating the binary values represented in each of the redirect operations with the binary string 291 it generated for the browser. As a result, the browser history of browser 104 can be uniquely or semi-uniquely tracked using the binary string 291.

Figure 3:
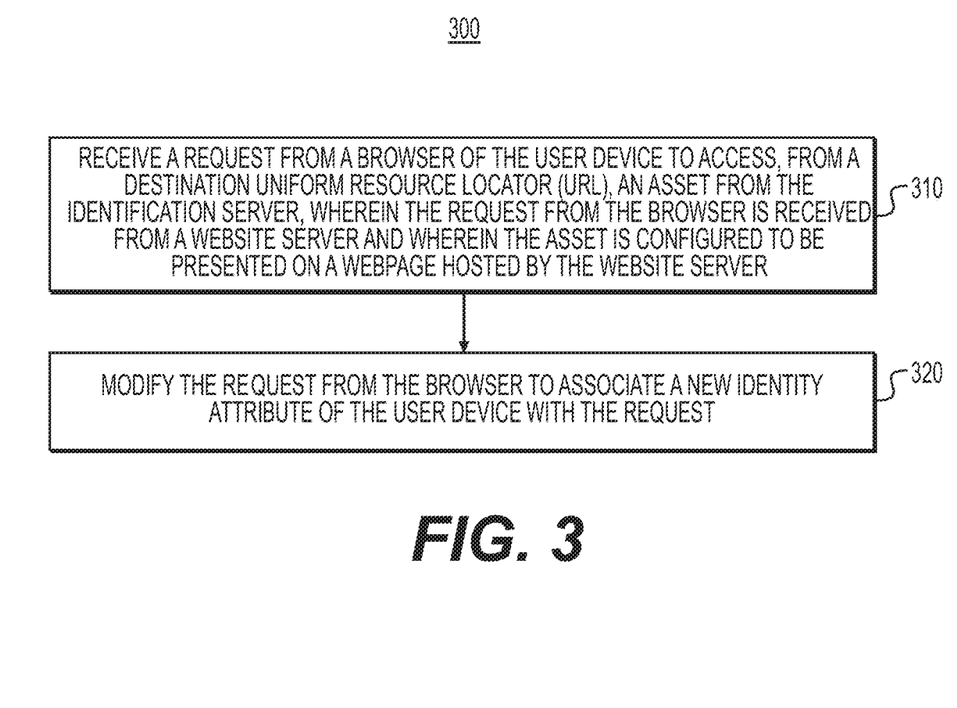
FIG. 3 depicts a flowchart of example method of identifying a user device, according to one or more embodiments.

Reference is now made to FIG. 3, which shows an example flow chart 300 of techniques for identifying a browser (e.g., browser 104) of a user device. At operation 310, the identification server 120 may receive a request from the browser 104 of a user device to access, from a destination URL, an asset from the identification server 120. The request from the browser 104 may be received from a website server 106 and the asset may be configured to be presented on a webpage hosted by the website server 106. At operation 320, the identification server 120 may modify the request from the browser 104 to associate a new identity attribute of the user device with the request.

Figure 4:
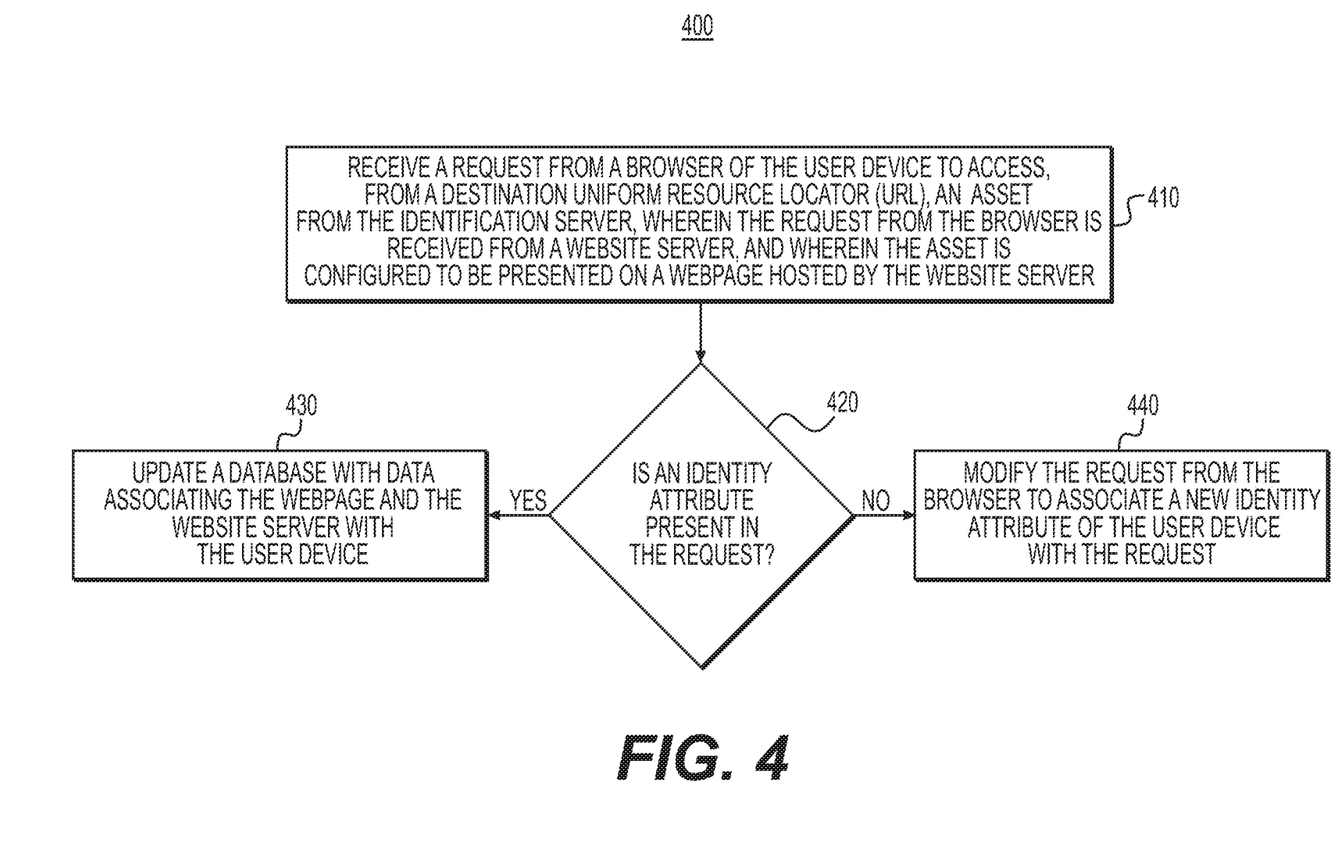
FIG. 4 depicts a flow chart of another example method of identifying the user device, according to one or more embodiments.

Reference is now made to FIG. 4, which shows another example flow chart 400 of techniques for identifying the browser 104 of the user device. At operation 410, the identification server 120 may receive a request from the browser 104 of the user device to access, from a destination URL, an asset from the identification server 120. The request from the browser 104 may be received from the website server 106. Additionally, the asset may be configured to be presented on a webpage hosted by the website server 106. The identification server 120, at operation 420, may make a determination as to whether an identity attribute of the user device is present in the request. If an identity attribute is present in the request (operation 420: YES), at operation 430, the identification server 120 may update a database with data associating the webpage and the website server with the user device. If an identity attribute is not present in the request (operation 420: NO), at operation 440, the identification server 120 may modify the request to associate a new identity attribute of the user device with the request.

Figure 5:
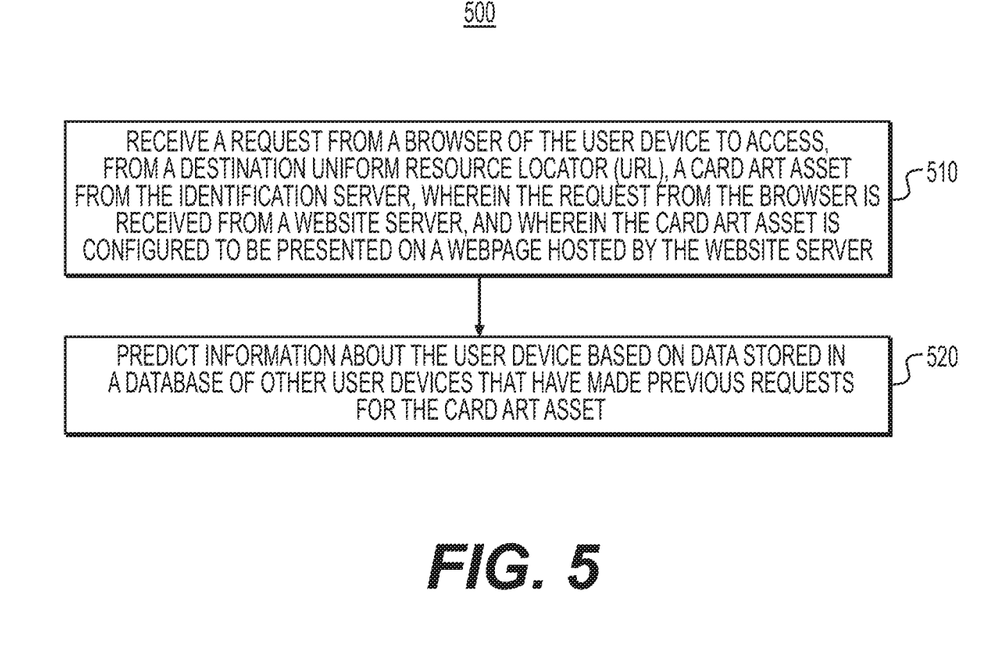
FIG. 5 depicts a flow chart of still another example method of identifying the user device, according to one or more embodiments.

Reference is now made to FIG. 5, which depicts a flow chart 500 of still another example method of identifying the browser 104 of the user device. At operation 510, the identification server 120 may receive a request from the browser 104 of the user device to access, from a destination URL, a card art asset from the identification server 120. The request from the browser 104 may be received from the website server 106. The card art asset may be configured to be presented on a webpage hosted by the website server 106. At operation 520, the identification server 106 may predict information about the user device based on data stored in a database (e.g., the identification server database 266) of other user devices that have made previous requests for the card art asset. For example, the identification server 106 may communicate with tracking server 132 (described in connection with FIG. 1, above) to utilize machine learning techniques to predict enhanced data about the browser 104, user 102 and user device operated by the user 102. For example, the identification server 120 may utilize machine learning or deep learning techniques to predict user account information for anonymously correlated URL requests that are made or not made by the browser 104. Additionally, the identification server 120 may predict products to promote to the user 102 based on engagement information obtained from other users and browser data stored in the identification server database 266 and the tracking database 134.

In general, by the techniques described herein, the identification server 120 can gather substantial data about the browser 104, the user 102, and the user device operated by the user 102. For example, the identification server 120 may collect base data, which includes asset or product impression information, impressions of affiliate products, offer click through rates, browser brands, operating system of the user device, Internet Protocol (IP) address information, category information about the user device (e.g., mobile device, desktop device, tablet, etc.), and user language information. The identification server 120 may collect auxiliary level data, including, for example, city, state, and zip code location information, latitude and longitude information, Internet Service Provider (ISP) information, time zone information, Virtual Private Network (VPN) or torrent (TOR) detection, and area code information. The identification server 120 may also collect user tracking information, for example, correlated request data, targeted advertising information, generalized trends, and product page positioning information. Furthermore, the identification server 120 may collect identity verification level information, including, for example, verified user account and profile information, enhanced correlated requests, individual targeted advertising, individual engagement trends, individual product preferences, multi-channel cross promotions, etc.

In general, any process discussed in this disclosure that is understood to be computer-implementable, such as the processes illustrated in FIGS. 2A-5, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as the website server 106, the identification server 120, the matching server 130, and the tracking server 132, may include one or more computing devices. If the one or more processors of the computer system are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 6:
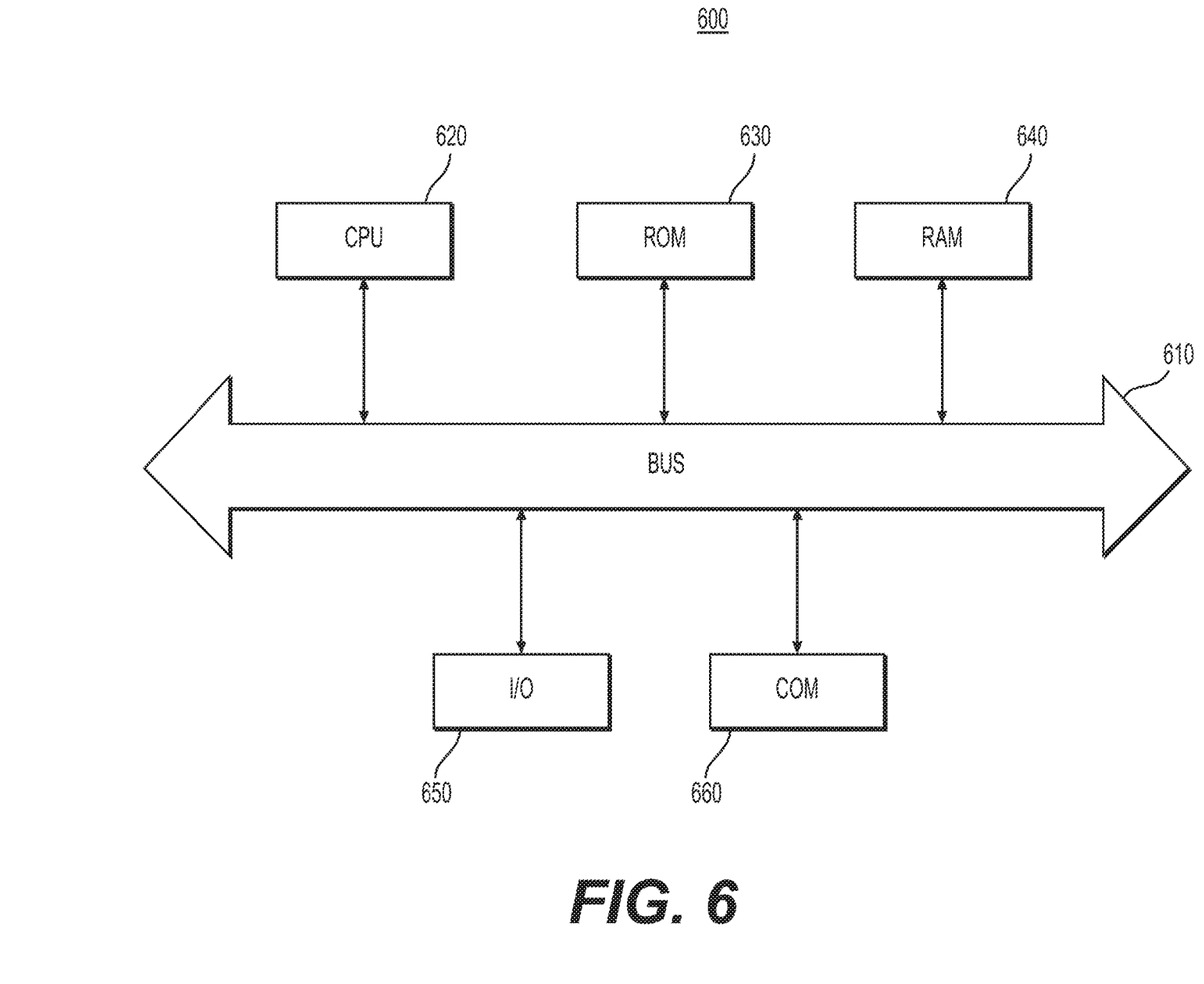
FIG. 6 shows an example block diagram of a computing device configured to execute various techniques and methods described herein, according to one or more embodiments.

FIG. 6 illustrates an example block diagram of a computer system/computing device 600 (e.g., the identification server 120). The computing device 600 may include processor(s) 620 (e.g., CPU, GPU, or other such processing unit(s)), a memory, and communication interface(s) 660 (e.g., a network interface) to communicate with other devices. The memory may include volatile memory, such as RAM 640, and/or non-volatile memory, such as ROM 630 and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of the memory. The computing device 600 may, in some embodiments, further include I/O devices 650 (e.g., input device(s) (e.g., a keyboard, mouse, or touchscreen) and output device(s) (e.g., a display, printer)). The aforementioned elements of the computing device 600 may be connected to one another through a bus 610, which represents one or more busses. In some embodiments, the processor(s) 620 of the computing device 600 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM 640, ROM 630, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A method for identifying a user device, the method comprising:
    at an identification server in communication with the user device over a network, receiving a request from a browser of the user device to access, from a destination uniform resource locator (URL), an asset from the identification server, wherein the request from the browser is received from a website server and wherein the asset is configured to be presented on a webpage hosted by the website server; and
    modifying the request from the browser to associate a new identity attribute of the user device with the request, wherein the modifying the request includes:
    redirecting the request to the destination URL via a sequence of intermediate URLs, wherein the destination URL and each one of the intermediate URLs is classified as either a secure redirect or a non-secure redirect;
    storing in a database a sequence of binary values corresponding to the intermediate URLs and the destination URL, wherein a first binary value is assigned to URLs classified as secure and a second binary value is assigned to URLs classified as non-secure; and
    associating the sequence of binary values as the new identity attribute of the user device.

2. The method of claim 1, further comprising sending the asset to the browser.

3. The method of claim 1, wherein the asset is a card art asset.

4. The method of claim 1, wherein the modifying the request further includes adding the new identity attribute as a unique identifier for the user device.

5. The method of claim 4, wherein the adding the unique identifier includes adding the unique identifier in an entity tag field of a hypertext transfer protocol (HTTP) request from the browser to access the asset.

6. The method of claim 1, wherein the intermediate URLs have a unique identifier for the user device.

7. The method of claim 6, wherein the redirecting the request includes redirecting the request to the intermediate URLs via a moved permanently hypertext transfer protocol (HTTP) redirect to the browser.

8. The method of claim 1, wherein redirecting the request includes redirecting to the secure redirect URLs via a hypertext transfer protocol (HTTP) strict transport security (HSTS) policy.

9. The method of claim 1, wherein redirecting the request includes redirecting the browser to each of the intermediate URLs and the destination URL.

10. The method of claim 1, further comprising evaluating the browser of the user device and an operating system of the user device to classify the user device into one or more known categories.

11. A method for identifying a user device, the method comprising:
- at an identification server in communication with the user device over a network, receiving a request from a browser of the user device to access, from a destination uniform resource locator (URL), an asset from the identification server, wherein the request from the browser is received from a website server, and wherein the asset is configured to be presented on a webpage hosted by the website server;
- determining whether an identity attribute of the user device is present in the request;
- when the identity attribute is not present in the request, modifying the request from the browser to associate a new identity attribute of the user device with the request, wherein the modifying the request includes:
- redirecting the request to the destination URL via a sequence of intermediate URLs, wherein the destination URL and each one of the intermediate URLs is classified as either a secure redirect or a non-secure redirect;
- storing in a database a sequence of binary values corresponding to the intermediate URLs and the destination URL, wherein a first binary value is assigned to URLs classified as secure and a second binary value is assigned to URLs classified as non-secure; and associating the sequence of binary values as the new identity attribute of the user device; and
- when the identity attribute is present in the request, updating a database with data associating the webpage and the website server with the user device.

12. The method of claim 11, wherein updating the database includes updating the database with one or more of browser data, location data, user tracking data, or identity verification data.

13. The method of claim 11, further comprising predicting information about the user device based on data stored in the database associated with other user devices.

14. The method of claim 11, further comprising sending the asset to the browser.

15. The method of claim 14, wherein the asset is a card art asset.

16. The method of claim 11, further comprising updating the database with timing data associated with the request.

17. The method of claim 16, further comprising correlating the timing data associated with the request to prior requests from the user device to determine positioning of the asset on the webpage.

18. The method of claim 11, further comprising assigning a plurality of requests received within a predetermined time frame to the user device.

19. A method for identifying a user device, the method comprising:
- at an identification server in communication with the user device over a network, receiving a request from a browser of the user device to access, from a destination uniform resource locator (URL), a card art asset from the identification server, wherein the request from the browser is received from a website server, and wherein the card art asset is configured to be presented on a webpage hosted by the website server;
- modifying the request from the browser to associate a new identity attribute of the user device with the request, wherein the modifying the request includes:
- redirecting the request to the destination URL via a sequence of intermediate URLs, wherein the destination URL and each one of the intermediate URLs is classified as either a secure redirect or a non-secure redirect;
- storing in a database a sequence of binary values corresponding to the intermediate URLs and the destination URL, wherein a first binary value is assigned to URLs classified as secure and a second binary value is assigned to URLs classified as non-secure; and associating the sequence of binary values as the new identity attribute of the user device; and
- predicting information about the user device based on data stored in a database of other user devices that have made previous requests for the card art asset.

* * * * *